United States Patent Office 3,524,611
Patented Aug. 18, 1970

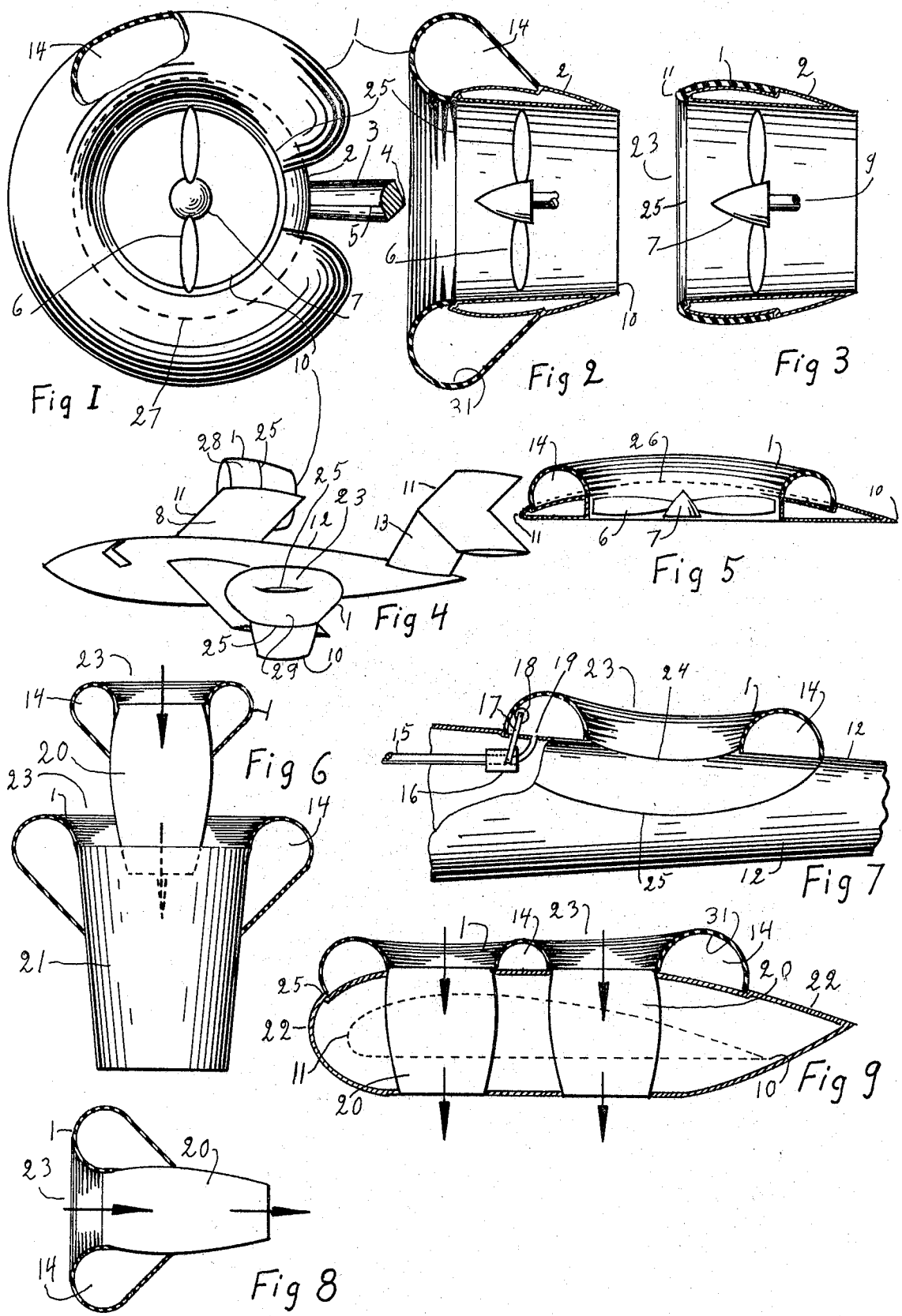

3,524,611
CONTROLLABLE AIR DUCT FOR VERTICAL AND SHORT TAKE-OFF AND LANDING TYPE OF AIR VEHICLE
Kurt Frank, 1640 S. Barry, Los Angeles, Calif. 90025
Filed July 22, 1968, Ser. No. 746,478
Int. Cl. B64d 29/00
U.S. Cl. 244—53                    2 Claims

ABSTRACT OF THE DISCLOSURE

A resilient inflatable toroidal member is mounted around the air intake of a shrouded propellor or fan, or jet engine of a vertical or short take-off air vehicle. The vehicle being of the type in which the shrouded propellors or jet engines are turned to a vertical position to lift the vehicle during take-off and to lower the vehicle during landing, and which are turned to a horizontal position during flight in order to drive the vehicle horizontally. The resilient member is inflated during take-off and landing of the air vehicle so as to increase the lift imparted to the vehicle during take-off and landing, and to serve as a braking means for the vehicle during landing; and the member is deflated during flight so as not to interfere with the high speed forward movement of the vehicle.

BACKGROUND OF THE INVENTION

Aircraft, missiles and the like are known which use shrouded propellor or jet engine units, and which units may be turned to a vertical position during take-off or landing, and then turned to a horizontal position during the actual flight of the vehicle. Such vehicles have the ability of being able to land or take off on an essentially vertical path. The resilient inflatable toroidal member of the present invention is mounted around the periphery of the air intake portion of the shrouded duct of the aforesaid propellor or jet engine.

By having the aforesaid toroidal member inflated during take-off or landing of the air vehicle, its increased surface area provides a desired aerodynamic characteristic for increasing the lift exerted on the aircraft during take-off and landing, and for an increased braking action during landing. During the flight of the vehicle, and when the ducted propellor or jet engine units are turned to the horizontal position, the said toroidal member is deflated so that it will not interfere with the high speed forward motion of the vehicle.

BRIEF DESCRIPTION OF THE DRAWINGS

FIG. 1 is a front view of a ducted propeller, or shrouded air screw as it is sometimes called, which is attached to the outer end of the wing of an aircraft; and which may be turned to a vertical position for take-off or landing of the aircraft, and then turned to a horizontal position during the flight of the aircraft; the air intake of the duct being surrounded by a resilient expansible inflatable toroidal member in accordance with the concepts of the invention;

FIG. 2 is a side section of the ducted propeller of FIG. 1, and showing the resilient inflatable toroidal member in an inflated condition;

FIG. 3 is a side section of the ducted propeller of FIG. 1, but with the toroidal member in a deflated condition;

FIG. 4 is a perspective view of an aircraft incorporating the ducted propeller of FIG. 1 on each of its wings, one of the ducted propellers being shown in the vertical landing or take-off position, and the other being shown in the normal horizontal flight position, for purposes of illustration only;

FIG. 5 is a fragmentary view of a modified structure in which a propeller or fan is rotatable about a vertical axis, and is mounted in an aperture in each wing of the aircraft; the resilient inflatable expansible toroidal member of the invention surrounding the aperture;

FIG. 6 is a schematic showing of a jet engine and augmenter, with a resilient toroidal inflatable member of the invention surrounding the air intakes of each of the components;

FIG. 7 shows the resilient inflatable toroidal member of the invention mounted on the fuselage of an aircraft and surrounding an air intake opening in the fuselage, this view also showing certain control components for the inflatable member; the fuselage being shown in fragmentary form and partly sectioned;

FIG. 8 is a schematic representation of a jet engine to which the concepts of the invention have been applied; and FIG. 9 is a dual type of vertical lift jet engine pod which also incorporates the concepts of the invention.

DETAILED DESCRIPTION OF THE ILLUSTRATED EMBODIMENTS

Referring now to the drawing, the expansible, resilient, toroidal, inflatable member referred to above is designated as 1. This inflatable member 1 is composed, for example, of rubber or other expansible material. In each of the illustrated embodiments, the toroidal member surrounds the air intake of the corresponding component referred to above. The duct or shroud surrounding the propeller or air screw in FIGS. 1–3 is designated as 2; whereas the section of the wing structure shown in FIG. 1 is designated 3. The ducted propeller of FIGS. 1–3 is mounted on the end of the wing 3, the wing having a trailing edge 4 and a leading edge 5. The air screw itself in FIGS. 1–3 is designated 6, and it has a central hub 7.

The aircraft wing in FIG. 4 is designated 8, whereas the air screw drive shaft is designated 9 in FIG. 3. The air outlet end of the duct 2 in FIG. 2 is designated 10, as are the air outlet ends of the duct of FIGS. 4, 5 and 9. The leading edge of the wing 8 is designated 11.

The fuselage of the aircraft in FIGS. 4 and 7 is designated 12, and the vertical stabilizer is designated 13. The internal chamber of the expansible toroidal member 1, when the toroidal member is inflated, for example, by air, is designated 14. The pressurized air is supplied to the chamber 14, for example, through a conduit 15 and inlet line 19, as shown in FIG. 7. The conduit 15 includes a valve 16 at one end, which is controlled, for example, by means of a lever 17. The lever 17 has a roller 18 which contacts the inner surface of the toroidal member 1, and causes the valve 16 to be turned off when the toroidal member 1 reaches its desired inflated configuration. Although the conduit and valve assembly is shown in FIG. 7 only, a similar assembly can be used in the other embodiments.

The jet engines of FIGS. 6, 8 and 9 are represented by the numeral 20, whereas the thrust augmenter of FIG. 6, which is mounted coaxially with the jet engine 20, is designated as 21. The dual jet engine pod of FIG. 9 is designated by the numeral 22. In each instance, the air intake to the ducted propeller or fan, or to the jet engine is shown as 23.

The outer edge of the circulair air inlet of the fuselage 12 of FIG. 7 is represented by the numeral 24, whereas the edge of the recess for the expansible toroidal member 1 is shown as 25. The wing contour when the toroidal member is deflated is illustrated in FIG. 5 by the numeral 26. This is the embodiment in which the ducted propeller 6 is mounted vertically in an opening in the wing structure. The duct outline when the toroidal member is deflated, on the other hand, is represented by the numeral 27 (FIG. 1).

The perspective representation of the duct in FIG. 4 is represented by the numeral 28, whereas the numeral 29 shows the duct turned 90° to its vertical position. The air flow over the surface of the toroidal member 1 increases the lift of the vehicle. If desired, minute grooves on the inside surface of the rubber surface may be provided, these being designated as 31 in FIGS. 2 and 9, but being too minute to be observed.

As indicated above, the object of the invention is to modify the areas surrounding the air intake of the ducted propellers, or jet engines, of aircraft, missiles, or other air vehicles, thereby to alter their flight characteristics, and also provide a better and more efficient air flow under high power output conditions. Specifically, the invention provides the toroidal member 1 formed, for example, by the expansible material, and which is mounted either to surround the entire periphery of the air intake of the ducted propeller or jet engine, or to surround a part of the air intake, as shown in FIG. 1.

Specifically, the concepts of the invention are applied to the type of air vehicle, in which the ducted propeller, or jet engine, are rotatable to a horizontal position or vertical position, such as shown in FIG. 4, and for the reasons described above. Then, when the ducted propellers or jet engines are in the vertical position, for landing or take-off, the toroidal members surrounding the air intakes thereof are inflated, so as to provide increased lift during take-off and landing, and increased braking action during landing. The inflation of the toroidal members may be carried out through the conduit 15, valve 16 and line 19, such as shown in FIG. 7, and under the control of the lever 17 and roller 18.

Then, when the ducted propeller or jet engine units are turned to a horizontal position for normal flight of the aircraft, the inflatable toroidal members are deflated, so as to cause no interference to the dynamic characteristics of the vehicle. The toroidal member 1 in its deflated position is shown, for example, in FIG. 3. When in that position, a metal cowl may be provided which closes down over the member 1 and locks, so as to provide a protection for the inflatable material of the member.

In the embodiment of FIG. 7, for example, the toroidal member 1 may be mounted directly on the fuselage without the presence of an air intake in the fuselage, and merely act as a controllable brake for the vehicle. The toroidal member may be mounted coaxially with the roll axis of the fuselage and encircle at least part of its circumference. Also, when coming in for a landing, but before the ducted propeller or jet engine units are turned to the vertical position, the toroidal members 1 may be inflated to provide a preliminary slowing down for the fast moving vehicle.

It will be realized that when the toroidal members 1 are inflated, the air drawn in through the corresponding air intake will follow the curvature 30 of the inflated member, as it is drawn into the air intake. The high speed air rushing over the surface of the toroidal member provides a high lift area, so that increased lift may be realized. The increased lift has been estimated to be as high as 40%.

As mentioned above, the toroidal member 1 may extend around the entire circumference of the air intake or partially around the circumference as shown in FIG. 1. It will be appreciated that the assembly of the invention may be used effectively on a wide variety of shapes, sizes and types of air intakes, and is not limited to those particular types shown in the drawing.

The toroidal member 1 may be attached to the aircraft by any suitable means, such as by adhesives, screws, rivets, flanges, metal attachment means molded into the rubber, and many others. Moreover, combinations of these attaching means may be used with any of the toroidal members effectively to attach the members to the aircraft. The small grooves 31 provided on the inner surface of the toroidal member 1 assist in assuring that all the air is removed from the interior of the toroidal member when it is deflated.

The control valve assembly 16, 17 and 18 of FIG. 7, as mentioned above, controls the amount of inflation of the toroidal member. The roller 18 follows the movement of the toroidal member by engaging the inner surface thereof, and it serves to shut off the flow of pressurized fluid through the tube 15 when the toroidal member becomes inflated to a desired extent. As mentioned the roller 18 is mounted on the end of the valve arm 17 which, in turn, shuts off the valve 16 when the expansible material of the toroidal member 1 is sufficiently expanded. The conduit 15 may be connected to a source of air pressure, for example, to the compressed air source in a turbo-prop type of engine. Any type of compressor, however, may be used to inflate the toroidal member. For example, a compressed gas bottle may be used as a means for inflating the toroidal member.

When the toroidal member is deflated, the conduit 15 is, by means of a pilot controlled or automatic valve, may be connected to a source of vacuum. This vacuum serves to draw the expandable material of the toroidal member 1 tightly against the underlying surface so as to make its aerodynamically stable. The vacuum may be created by any suitable means. As also mentioned, a suitable cowl may be provided for enclosing the toroidal member when it is deflated, so as to protect the member. In the case of the ducted propeller units, and jet engine units, in the embodiments described, and which units are rotatable through 90° between horizontal and vertical positions; an automatic valve may be provided which automatically causes the toroidal member to inflate, when the corresponding ducted propeller or jet engine is turned to a particular angular position.

As mentioned above, FIG. 1 is a front view of a ducted propellor unit, which is also called a shrouded air screw, or a ducted or shrouded fan, and which is attached to the outer end of an airplane wing 3. As shown, the major part of the periphery of the front end outside area of the duct is covered with the inflated toroidal member of the invention. The outline of the duct, when the toroidal member is deflated, is represented by the dotted line 27.

When the toroidal member is in the inflated position shown in FIG. 1, it will serve as an air brake when the ducted propeller is in its horizontal position, so as to slow down the fast moving aircraft. As also described, the entire duct may be turned into a substantially vertical position for vertical or short take-off and landings of the aircraft. As also described, the toroidal member, when inflated, serves to facilitate such take-offs and landings.

FIG. 2, as described, shows a sectional side view of the duct of FIG. 1, and with the toroidal member inflated. The propeller may be powered, for example, by any suitable known means. FIG. 3, as mentioned, is a view like FIG. 2, but with the toroidal member deflated, so as to follow closely the contours of the outer surface 2 of the duct. As also indicated, a suitable cowl may be provided which will extend over the deflated toroidal member and lock, so as to protect the toroidal member. The ducted propellers are also shown in the perspective view of FIG. 4.

FIG. 4 shows one type of application of the ducted propeller, as modified by the inflatable toroidal member of the present invention. The duct 28 on the far side of the fuselage 12 in FIG. 4 is shown, for example, in its horizontal position and with the toroidal member deflated, this being the normal position of the duct and of the toroidal member during fast horizontal flight of the aircraft.

The perspective view of the duct 29 on the other wing of the aircraft is shown, for example, with the duct turned 90°. It should be explained that the differing illustrated positions of the ducts 28 and 29 in FIG. 4 are shown merely for illustrative reasons. It will be understood, of course, that both ducts normally will assume either the horizontal position with the toroidal members deflated, or the vertical position with the toroidal members inflated. Typical application of this invention would be on aircraft such as the Bell X22A and the Nord 500 Cadet.

The duct 29 in its vertical position has the air intake 23 facing upwardly for vertical take-off or landing. The toroidal member is inflated for the duct 29, in order to assist in the vertical take-off or landing of the aircraft, as described above. As mentioned, the ducts 28 and 29 are always controlled to be either in a vertical or horizontal position at the same time, contrary to the illustration of FIG. 4, since these ducts must act in unison. It should also be pointed out that any number of ducts may be used on an aircraft. Moreover, suitable balancing means may be provided for balancing the aircraft during the vertical or short take-off or landing.

The embodiment of FIG. 5 is known generally as a "fan in the wing" type of aircraft. In this type of vehicle, a fan is mounted in a large aperture in the wing, and is turned at a high speed to draw air from the upper side of the wing to discharge it through the lower side, for providing the aircraft with vertical or short take-off or landing capabilities. Louvers are often used to direct the air flow from the fan of FIG. 5, and also to cover the opening for fast horizontal flight. Typical examples of this type of aircraft is the United States Army XV5a. As described above, the toroidal member of the invention may also be incorporated in this latter type of aircraft, so as to improve its landing and take-off capabilities.

A modification of the embodiment of FIG. 5 is known to the art as the "fold-out" fan, and in which the units fold out from the fuselage for vertical or short take-offs and landings only, and are folded back into the fuselage during normal horizontal flight of the aircraft.

In the embodiment of FIG. 6, the toroidal member of the present invention is mounted about the air intake of a jet engine 20; and also about the air intake of the augmenter 21. The augmenter 21 is merely a cylindrical, slightly tapered tube in which the exhaust gases of the jet engine are mixed with air drawn through the augmenter by the exhaust blast. By using a rocket engine instead of the jet engine 20, the rocket engine may be augmented by the same type of augmenter 21.

A part of the fuselage of an aircraft is shown in FIG. 7 which, as mentioned above, has an air intake hole on its upper side. The fuselage 12 has a circular cross section, and the air intake also has a circular shape.

The toroidal member of the invention is mounted around the air intake for the reasons described above. As also mentioned previously, the toroidal member may be mounted on the fuselage itself, without the corresponding air intake, to serve as a brake for the aircraft. As before, the toroidal member may be mounted coaxially with the fuselage of the vehicle and with the roll axis.

The jet engine 20 of FIG. 8, which also incorporates the toroidal member of the invention, may be a fan jet, turbo jet, pulse jet, ram jet, turbo prop, lift engine, or the like. Swing-out lift engines may be used in conjunction with the invention, so as to increase the lift of such engines. Swing-out lift engines are usually stored in the fuselage of the aircraft, and swing out on pivoted arms for vertical or short take-offs and landings.

As also mentioned above, the duel jet engine of FIG. 9 is usually known as an engine pod, or engine nacelle. The engine pod of FIG. 9 comprises two lift jet engines which are disposed vertically, and which are surrounded by the toroidal members of the invention. The Dornier DL31 is an excellent example of the engine pod application, and most suitable for the application of the concept of the present invention. Clearly any suitable number of engines may be housed in the pod.

It will be appreciated, therefore, that the invention may be applied to a wide variety of lift engines, and the like, and has the dual function of increasing the lift capabilities and of increasing braking during landing, so as to enhance the efficiency of the aircraft.

Therefore, while particular embodiments have been shown and described, modifications may be made. It is intended in the following claims to cover the modifications which fall within the scope of the invention.

What is claimed is:

1. An expansible structure for use in conjunction with the air screw of an air vehicle comprising: an air screw mounted for rotation about a particular axis; a tubular shaped open ended member having an inner diameter and an outer diameter mounted coaxially with said air screw about said particular axis, said duct having an air intake portion; and a toroidal-shaped inflatable member composed of expansible material mounted on said duct and having one end attached to the edges of said duct adjacent said air intake portion, and a second edge attached to said duct in a position displaced back from said first-named edge so as to provide a toroidal configuration surrounding at least a part of the periphery of said air intake portion of said tubular duct when said toroidal-shaped member is inflated, and which includes a control valve assembly for introducing pressurized fluid to the interior of said toroidal shaped inflatable member to control the amount of inflation thereof, said control valve assembly including a roller engaging the inner surface of said toroidal member and following the movements thereof to shut off the flow of pressurized fluid through said control valve assembly when the toroidal member is inflated to a desired extent.

2. A toroidal shaped, expansible structure for use in conjunction with vertical take off and landing aircraft, and short take off and landing aircraft comprising: a ducted-propeller-like structure, the duct of which houses at least one air propelling rotor; said duct having an inside diameter and an outside diameter of functional, aerodynamic configuration for relatively fast, horizontal flight, said outside diameter of the duct being at least partially coaxial with inside diameter; said outside of the duct being at least partially covered with expansible material of said expansible structure; the forward part of said expansible structure being attached to the frontal part of the inside of the duct and the rear part of said expansible structure being attached to the outside diameter of the duct, displaced rearward from the leading edge of said duct; a means for inflating said expansible structure; a valve, a part of which keeps in contact with some part of the expansible structure and limits the extent of its inflation; said valve connecting the underside of the deflated, expansible structure to a vacuum source.

References Cited

UNITED STATES PATENTS

| 2,922,277 | 1/1960 | Bertin | 244—12 |
| 3,058,693 | 10/1962 | Doak | 244—53 |
| 3,074,232 | 1/1963 | Soyer | 244—53 |
| 3,130,941 | 4/1964 | Pazmany | 244—53 |
| 3,224,712 | 12/1965 | Taylor et al. | 244—53 |
| 3,302,907 | 2/1967 | Wilde et al. | 244—55 |

MILTON BUCHLER, Primary Examiner

J. E. PITTENGER, Assistant Examiner